US012748772B2

(12) United States Patent
Tao et al.

(10) Patent No.: US 12,748,772 B2
(45) Date of Patent: Sep. 29, 2026

(54) REPLICATING UNLOGGED DATA CHANGES IN A DATABASE MANAGEMENT SYSTEM

(71) Applicant: International Business Machines Corporation, Armonk, NY (US)

(72) Inventors: Qian Tao, Beijing (CN); Su Li Hou, Beijing (CN); Fu Fei Xu, Beijing (CN); Jie Zhang, Beijing (CN); Jia Dong Yang, San He Shi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/991,833

(22) Filed: Dec. 23, 2024

(65) Prior Publication Data

US 2026/0178611 A1 Jun. 25, 2026

(51) Int. Cl.
*G06F 16/27* (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS 6,173,292 B1 * 1/2001 Barber ................ G06F 11/1471 707/999.005
8,818,943 B1 * 8/2014 McCline ............... G06F 16/275 707/624
10,229,152 B2 3/2019 Bourbonnais et al.
11,429,641 B2 8/2022 Brodt et al.
11,966,411 B1 * 4/2024 Rajgaria ............... G06F 16/254
2007/0174355 A1 * 7/2007 Woo .................... G06F 16/2358
2011/0145201 A1 * 6/2011 Holst .................. G06F 11/2074 711/E12.001
2014/0172794 A1 6/2014 Bartholomä et al.
2019/0095297 A1 * 3/2019 Neall ................. G06F 11/2082
(Continued)

FOREIGN PATENT DOCUMENTS

KR 0134172 B1 5/1998
KR 10-1024494 B1 3/2011

OTHER PUBLICATIONS

Authors et. al.: Disclosed Without Attribution, IP.com No. IPCOM000269373D, "A Method to Detect and Replicate Non-Logged Changes to A Source Data Store Using Log Injection", Apr. 11, 2022, 6 pages.

*Primary Examiner* — Khanh B Pham
(74) *Attorney, Agent, or Firm* — Cantor Colburn LLP; Stephen Yoder

(57) ABSTRACT

Examples described herein provide systems and methods for replicating unlogged data changes in a database management system are disclosed. The method involves identifying a load operation in a transaction log, determining a log sequence number (LSN) associated with the load operation, and identifying data pages in a source database with headers containing the load LSN. Data from these pages is extracted and saved to an external file. The target database is updated by loading the extracted data from the external file, allowing for incremental replication. This approach optimizes replication efficiency by avoiding a full refresh of the target table, reducing resource consumption, and enhancing system performance.

17 Claims, 4 Drawing Sheets

(56) References Cited

U.S. PATENT DOCUMENTS

| | | | | |
|---|---|---|---|---|
| 2021/0303420 | A1 | 9/2021 | Willoughby et al. | |
| 2024/0078179 | A1* | 3/2024 | Zuo | G06F 3/061 |
| 2026/0030120 | A1* | 1/2026 | Zhao | G06F 11/1469 |

* cited by examiner

REPLICATING UNLOGGED DATA CHANGES IN A DATABASE MANAGEMENT SYSTEM

BACKGROUND

The disclosure generally relates to database management systems, specifically to replicating unlogged data changes in a database management system.

Log replay-based technology is a prevalent method for data transfer between databases by utilizing the transaction log of the source database. This transaction log records modifications to the source database, including inserts, updates, and deletes. However, certain database operations present challenges to this technology. These operations do not log detailed data changes, leading to an inability to replicate them and resulting in discrepancies between the source and target databases.

Current methods either issue a warning when an unlogged operation is detected, indicating potential desynchronization, or trigger an automatic reload of the entire target table to resynchronize the data. This approach can incur significant costs, particularly when the source table is large, as the process necessitates a full refresh of the data, even if only a small portion has changed. This inefficiency underscores the need for a more streamlined solution to handle unlogged data changes effectively.

SUMMARY

According to one aspect of the present invention, a computer-implemented method for replicating unlogged data changes in a database management system is provided. The method includes identifying a load operation in a transaction log for the database management system, identifying a log sequence number (LSN) associated with the load operation, identifying one or more data pages of a source database that have a header that includes a load LSN field which includes the LSN associated with the load operation, extracting data from the one or more data pages and saving the extracted data to an external file, and updating a target database by loading the extracted data in the external file into the target database.

The above features and advantages, and other features and advantages, of the disclosure, are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

Figure 1:
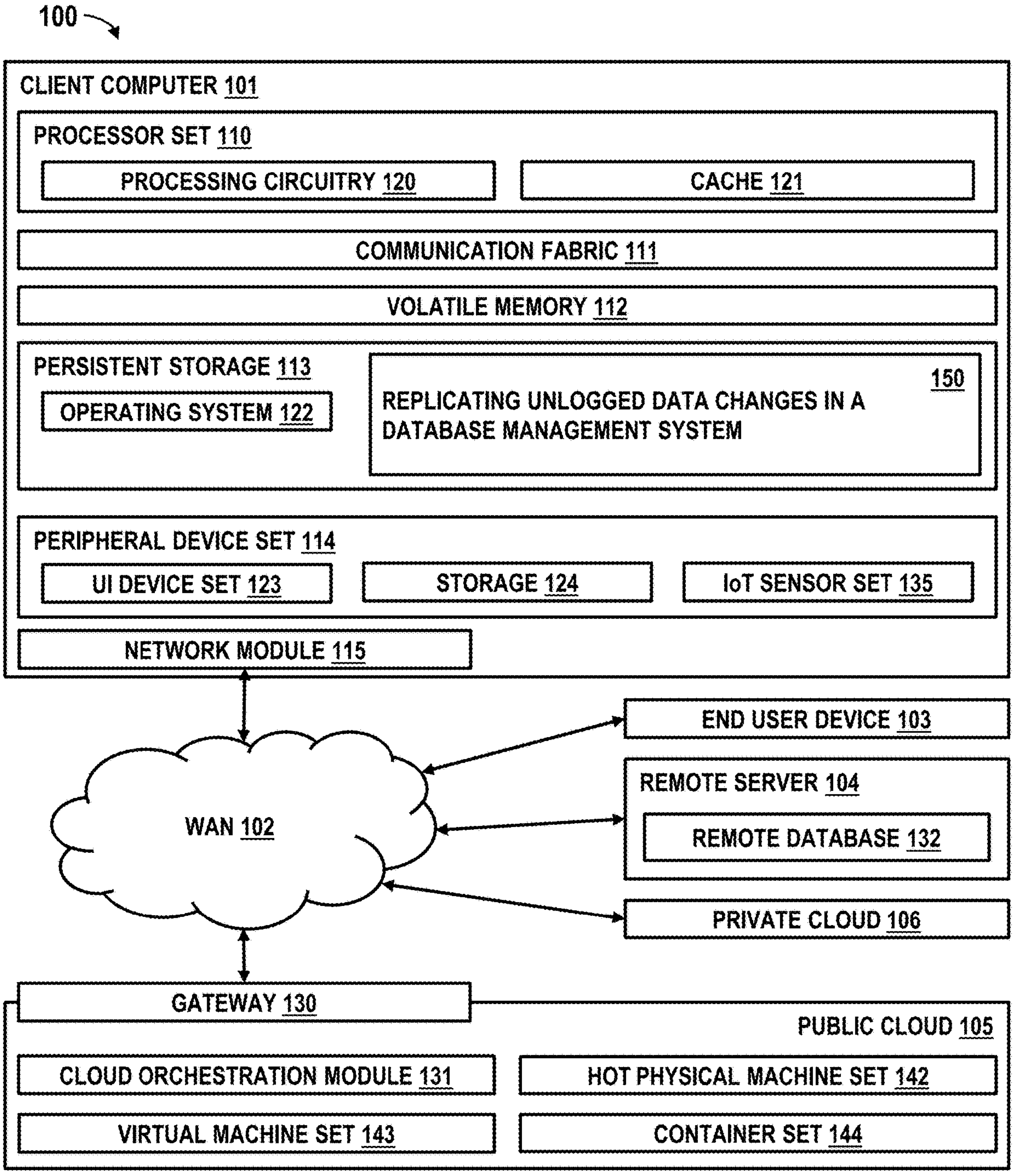
FIG. 1 illustrates a block diagram of a computing environment, according to one or more embodiments.

The detailed description explains embodiments of the disclosure, together with advantages and features, by way of example with reference to the drawings.

DETAILED DESCRIPTION

Log replay-based technology is widely used for transferring data between relational databases by leveraging the transaction log of the source database. This log captures all changes, such as inserts, updates, and deletes. However, some operations do not log detailed data changes, making replication difficult and causing discrepancies between source and target databases.

Existing solutions either warn of potential desynchronization when unlogged operations are detected or trigger a complete reload of the target table to synchronize data. This can be costly, especially with large tables, as it requires refreshing all data even if only a small portion has changed. This highlights the need for a more efficient method to manage unlogged data changes.

Exemplary embodiments include methods and systems for replicating unlogged data changes in relational database management systems. By utilizing a load log sequence number (LSN), the disclosed system identifies unlogged data and extracts the unlogged data to an external file. This external file is then loaded into the target database, allowing for incremental replication rather than a full refresh of the target table. This approach significantly reduces replication time and enhances efficiency without affecting the load speed.

The disclosed systems and methods enhance the functioning of a computer by optimizing the process of data replication in relational database management systems. By utilizing a load LSN, the system efficiently identifies and manages unlogged data changes. This allows for incremental replication rather than a full refresh of the target database, significantly reducing the computational resources and time required for data synchronization. Additionally, the method minimizes the impact on system performance by avoiding unnecessary data processing and network usage, which leads to faster replication times and improved overall system efficiency, thereby allowing the computer to allocate resources to other tasks and maintain optimal performance levels.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code includes replicating unlogged data changes in a database management system, as shown at block 150. In addition to a controller for controlling the operations of a metal cutting tool, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, as identified above), peripheral device set 114 (including user interface (UI) device set 123, storage 124, and Internet of Things (IoT) sensor set 135), and network module 115. Remote server 104 includes remote database 132. Public cloud 105 includes gateway 130, cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in persistent storage 113 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 135 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 131. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to one or more embodiments, the computing environment 100 can provide remote data storage. For example, the computer 101 can be a cloud storage system or other suitable system for storing data that is accessible to a user remotely, such as by accessing the computer 101 using the end user device 103. That is, a user can send a user operation (also referred to as a "user request") from the end user device 103 to the computer 101 via the WAN 102. Although the user operation may appear to be simple, such as uploading an object to a cloud storage system, the complications of operating a cloud computing system often have side effects and produce ancillary data, which may be consumed by both the operator of the system (e.g., the computer 101) and by users or other components of the cloud architecture (e.g., the computing environment 100). Ancillary data may be created by user operations that trigger the creation of the ancillary data. Ancillary data may be resource consumption information, notification data, and/or the like, including combinations and/or multiples thereof. Data for an independent event may be inferred from another event (e.g., event to update resource consumption information for an entity in a system also means that the total consumption information for the owner of the entity is also updated).

Figure 2:
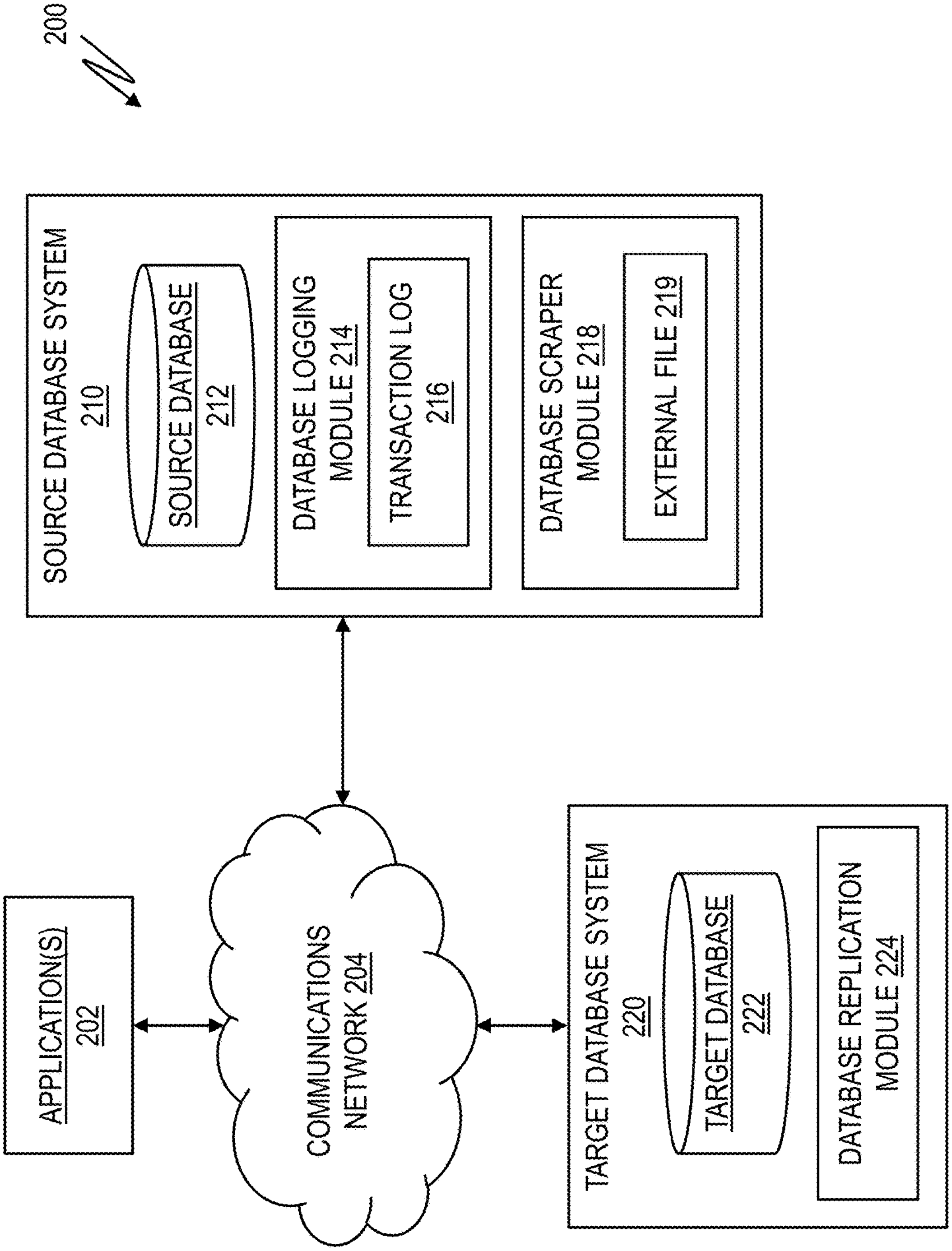
FIG. 2 illustrates a block diagram of a system for replicating unlogged data changes in a database management system according to one or more embodiments.

Referring now to FIG. 2, a block diagram of a system 200 for replicating unlogged data changes in a database management system is provided. In exemplary embodiments, the application(s) 202 serve as the interface for users or automated processes to interact with the system 200. These applications 202 can initiate data operations and communicate with other components through the communications network 204. This communications network 204 facilitates data exchange and control signals between the various modules and databases, ensuring seamless integration and operation. In exemplary embodiments, the communications network 204 may include one or more public networks, one or more private networks, and various combinations thereof.

In exemplary embodiments, the source database system 210 houses the source database 212, which stores the original data subject to replication. The database logging module 214 within the source database system 210 is configured to capture operations performed on the source database 212 and to responsively create a transaction log 216. The transaction log 216 includes operations such as inserts, updates, and deletes. The transaction log 216 records these operations, providing a basis for replication processes. In exemplary embodiments, when a load operation is performed on the source database 212, the database logging module 214 records a log operation in the transaction log and also records a load log sequence number (LSN) associated with the load operation.

In exemplary embodiments, the transaction log 216 is periodically transmitted to the target database system 220, via the communications network 204 and the target database system 220 utilizes the transaction log 216 to replicate modifications made to the source database 212 to the target database. For example, when an insert operation is performed on the source database 212, the database logging module 214 records this operation in the transaction log 216. This log entry includes details of the inserted data, such as the table and row information. Upon receiving the transaction log, the target database system 220 utilizes the log to replicate the insert operation. The database replication module 224 reads the log entry and applies the same insert operation to the target database 222, ensuring that the new data is accurately reflected in the target system.

In exemplary embodiments, the transaction log 216 does not include details about the data loaded into the source database 212 during a load operation. Rather, the transaction log 216 only indicated that a load operation was performed and includes a load LSN associated with the load operation. In exemplary embodiments, when the database replication module 224 of the target database system 220 encounters a load operation, the database replication module 224 extracts the load LSN associated with the load operation and transmits a request to the source database system 210 for the data loaded into the source database 212 as part of the load operation.

In exemplary embodiments, the database scraper module 218 is configured to identify data pages associated with unlogged operations. For example, the database scraper module 218 is configured to locate relevant data pages in the source database 212 and extract the data to an external file 219. In one embodiment, the database scraper module 218 searches the source database 212 and identifies all data pages of the database scraper module 218 that have a load LSN value that is associated with the load operation. In exemplary embodiments, the database scraper module 218 combines the identified data pages into an external file 219, that is provided to the target database system 220. This external file 219 serves as a temporary storage medium for the extracted data, facilitating the transfer of the data to the target database system 220.

In exemplary embodiments, the target database system 220 receives the external file 219 and updates the target database 222. The database replication module 224 manages this process, ensuring that the data from the external file is incrementally loaded into the target database. This approach avoids a full refresh of the target table, optimizing replication efficiency and reducing resource consumption.

In exemplary embodiments, each of the data pages of the source database 212 includes a header that stores various information regarding the data page. In exemplary embodiments, the data pages include a log sequence number that is updated each time data stored on the data page is updated. In addition, the data pages include a load log sequence number (LSN) that has a value that is set when data is originally loaded into a data page. In exemplary embodiments, the load LSN is static and does not change once the value has been set.

Figure 3:
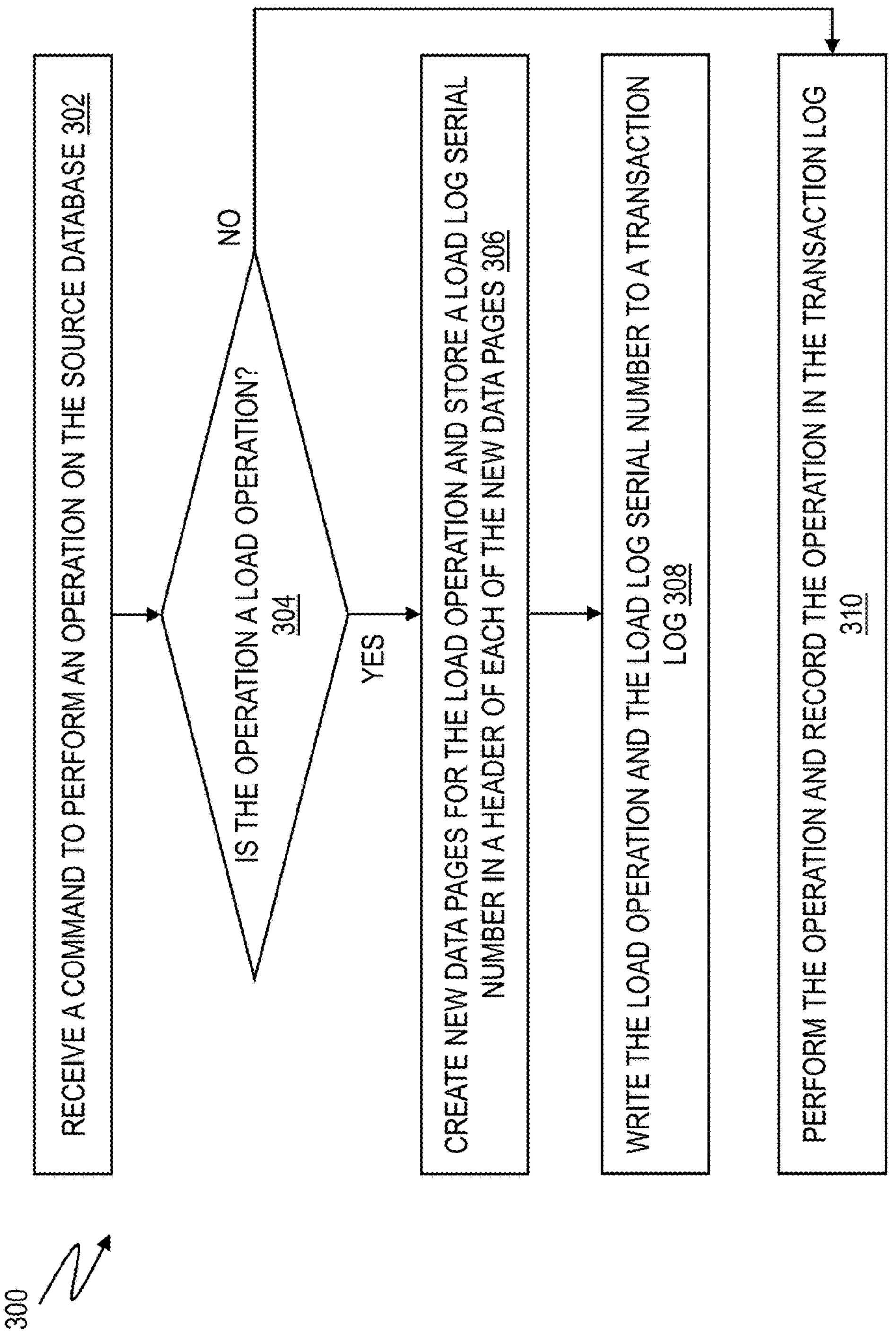
FIG. 3 illustrates a flow chart diagram of a method for logging transactions in a database management system according to one or more embodiments.

Referring now to FIG. 3, a flow chart diagram of a method 300 for logging transactions in a database management system according to one or more embodiments is shown. In exemplary embodiments, the method 300 is performed by the source database system 210 shown in FIG. 2. The method 300 begins at block 302 by receiving a command to perform an operation on the source database. Next, as shown at decision block 304, the method 300 includes determining whether the operation is a load operation. This decision point directs the flow of the method based on the type of operation identified. Based on a determination that the operation is a load operation, the method 300 proceeds to block 306 and includes creating new data pages for the load operation and storing a load log serial number in a header of each of the new data pages. This step ensures that the load operation is properly documented with an identifier. Next, as shown at block 308 the method 300 includes writing the load operation and the load log serial number to a transaction log. In exemplary embodiments, the data associated with the load operation is not written to the transaction log. Based on a determination at decision block 304 that the operation is a load operation, the method 300 proceeds to block 310 and includes performing the operation and recording the operation in the transaction log.

Continuing with reference to FIG. 2, in an exemplary scenario, the source database system 210 receives a command to perform a load operation on a large dataset. This dataset consists of new employee records that need to be added to the existing employee table in the source database 212. Upon receiving the command, the system identifies the operation as a load operation. It then creates new data pages specifically for this load operation. Each of these data pages is assigned the same load log sequence number (Load LSN) in its header, which corresponds to the load operation. Next, the source database system 210 writes the load operation details, including the load LSN, to the transaction log 216. However, the actual employee data being loaded is not included in the transaction log, preserving log space and efficiency. The source database system 210 then executes the load operation, transferring the new employee records into the newly created data pages. This process is completed without affecting existing data pages, ensuring that the load operation is isolated and efficiently managed. The transaction log 216 records the completion of the load operation, including the load LSN, allowing for future replication processes to identify and handle the unlogged data changes effectively.

Figure 4:
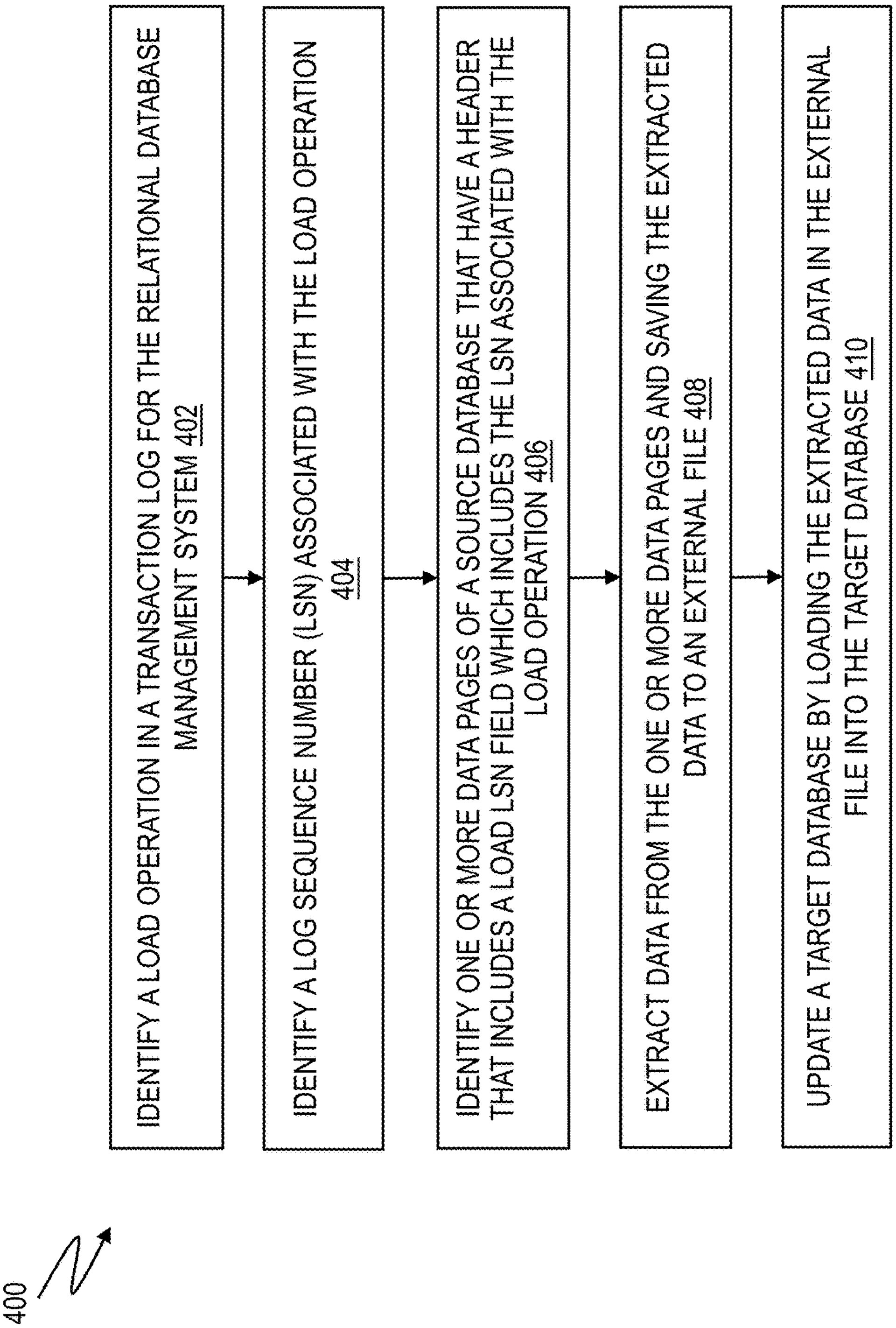
FIG. 4 illustrates a flow chart diagram of a method for replicating unlogged data transactions in database management according to one or more embodiments.

Referring now to FIG. 4, a flow chart diagram of a method 400 for replicating unlogged data transactions in database management according to one or more embodiments is shown. In exemplary embodiments, the method 400 is performed by the source database system 210 and the target database system 220 shown in FIG. 2. The method 400 begins at block 402 by identifying a load operation in a transaction log for the relational database management system. The transaction log serves as a record of operations performed on the source database. The identification process involves scanning the transaction log to detect entries that correspond to load operations. This step is utilized for recognizing operations that do not log detailed data changes, thereby enabling the subsequent steps in the replication process.

Once the load operation is identified, the method 400 proceeds to identify a log sequence number (LSN) associated with the load operation, as shown at block 404. In exemplary embodiments, the LSN acts as an identifier for the load operation within the transaction log. Extracting the LSN from the transaction log allows the system to track and manage the specific load operation, facilitating the identification of relevant data pages in the source database. As shown at block 406, the method 400 continues by identifying one or more data pages of a source database that have a header that includes a load LSN field which includes the LSN associated with the load operation. This involves searching the source database for data pages whose headers contain a load LSN field matching the extracted LSN. These data pages are specifically associated with the load operation, and their identification is for isolating the data that needs to be replicated.

Following the identification of the relevant data pages, the method 400 involves extracting data from the one or more data pages and saving the extracted data to an external file, as shown at block 408. The extraction process involves reading the data stored in the identified data pages and transferring the data to an external file. This external file serves as a temporary storage medium, facilitating the transfer of data to the target database system without requiring a full refresh of the target table.

The final step in the method 400 involves updating a target database by loading the extracted data in the external file into the target database, as shown at block 410. The target database system receives the external file and incrementally loads the data into the target database. This approach optimizes replication efficiency by avoiding a complete refresh of the target table, thereby reducing resource consumption and enhancing overall system performance.

Continuing with reference to FIG. 2, in an exemplary scenario, the target database system 220 receives a transaction log from the source database system 210 via the communications network 204. This transaction log contains various entries, including inserts, updates, deletes, and load operations. As the target database system 220 processes the transaction log, it encounters a load operation entry. This entry includes a load LSN associated with the load operation but does not contain the actual data loaded into the source database. Upon identifying the load operation, the target database system extracts the load LSN from the transaction log. Using this LSN, the target database system 220 sends a request to the source database system 210 for the data associated with the load operation. The source database system 210 responds by providing an external file containing the data pages that match the load LSN. The target database system 220 receives the external file and begins updating the target database 222. The database replication module 224 manages this process, incrementally loading the data from the external file into the target database 222. This approach ensures that only the necessary data is updated, avoiding a full refresh of the target table. By processing the transaction log in this manner, the target database system efficiently replicates the load operation, maintaining data consistency and optimizing resource usage.

In an alternative embodiment, the source database system 210 is configured to automatically create and transmit an external file to the target database system 220 immediately after a load operation is performed. Upon executing a load operation, the source database system 210 identifies the relevant data pages associated with the operation. Each of these pages contains a load LSN in its header, which corresponds to the load operation. Instead of waiting for a request from the target database system 220, the source database system 210 proactively extracts the data from these identified pages and compiles it into an external file. Once the external file is created, the source database system automatically transmits it to the target database system via the communications network. This transmission occurs without requiring any additional requests or interventions. Upon receiving the external file, the target database system begins updating the target database. The database replication module 224 manages this process, incrementally loading the data from the external file into the target database 222. This approach ensures efficient replication by avoiding a full refresh of the target table. This embodiment streamlines the replication process by reducing latency and ensuring that the target database is updated promptly after a load operation, thereby maintaining data consistency and optimizing resource usage.

In exemplary embodiments, by identifying a load operation in a transaction log, the method allows for the detection of operations that do not log detailed data changes, which are typically challenging for traditional replication methods. This identification is crucial for managing unlogged data changes effectively. Utilizing a log sequence number (LSN) associated with the load operation enables precise tracking and management of specific load operations. This facilitates the identification of relevant data pages in the source database, ensuring that only the necessary data is targeted for replication. Identifying data pages with headers that include a load LSN field allows the system to isolate data specifically associated with the load operation. This targeted approach prevents unnecessary data processing and ensures that only relevant data is extracted for replication. Extracting data from the identified data pages and saving it to an external file provides a temporary storage solution that facilitates efficient data transfer to the target database. This method avoids the need for a full refresh of the target table, optimizing resource usage and reducing replication time. Updating the target database by loading the extracted data from the external file allows for incremental replication. This approach significantly enhances replication efficiency by minimizing resource consumption and improving overall system performance, as it avoids the computational overhead associated with a complete table refresh.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for replicating unlogged data changes in a database management system, the method comprising:

identifying a load operation in a transaction log for the database management system;

identifying a log sequence number (LSN) associated with the load operation;

identifying one or more data pages of a source database that have a header that includes a load LSN field that is written once when the data page is created for the load operation and thereafter remains unchanged which includes the LSN associated with the load operation, the header further including a page LSN field that is updated each time data stored on the page is modified;

extracting data from the one or more data pages and saving the extracted data to an external file for provision to a target database system via a communications network; and updating a target database of the target database system by loading the extracted data in the external file into the target database wherein, immediately upon completion of the load operation and without receiving a request from the target database system, the source database system extracts the data from the identified data pages and transmits the external file to the target database system.

2. The computer-implemented method of claim 1, wherein identifying the LSN associated with the load operation comprises extracting the LSN from the transaction log.

3. The computer-implemented method of claim 1, wherein updating the target database comprises incrementally loading the extracted data in the external file into the target database.

4. The computer-implemented method of claim 1, wherein the identifying the one or more data pages of the source database, the extracting data from the one or more data pages, and the saving the extracted data to the external file are performed automatically based on a completion of the load operation by the source database.

5. The computer-implemented method of claim 1, wherein the identifying the one or more data pages of the source database, the extracting data from the one or more data pages, and the saving the extracted data to the external file are performed based on the load operation being identified in the transaction log by a target database system of the database management system.

6. The method of claim 1, wherein the identifying of the one or more data pages comprises searching the source database for data pages whose headers contain a load LSN value that matches the log sequence number associated with the load operation, and combining the identified data pages into the external file prior to transfer to the target database system.

7. The method of claim 1, further comprising periodically transmitting the transaction log from the source database system to the target database system via a communications network, and wherein the identifying of the load operation occurs upon processing the periodically transmitted transaction log.

8. A system comprising:

a memory comprising computer readable instructions; and a processing device for executing the computer readable instructions, the computer readable instructions controlling the processing device to perform operations comprising:

identifying a load operation in a transaction log for a database management system;

identifying a log sequence number (LSN) associated with the load operation;

identifying one or more data pages of a source database that have a header that includes a load LSN field that is written once when the data page is created for the load operation and thereafter remains unchanged which includes the LSN associated with the load operation, the header further including a page LSN field that is updated each time data stored on the page is modified;

extracting data from the one or more data pages and saving the extracted data to an external file for provision to a target database system via a communications network; and updating a target database of the target database system by loading the extracted data in the external file into the target database, wherein the processing device is further configured, immediately upon completion of the load operation and without receiving a request from the target database system, to automatically extract the data from the identified data pages and transmit the external file to the target database system.

9. The system of claim 8, wherein identifying the LSN associated with the load operation comprises extracting the LSN from the transaction log.

10. The system of claim 8, wherein updating the target database comprises incrementally loading the extracted data in the external file into the target database.

11. The system of claim 8, wherein the identifying the one or more data pages of the source database, the extracting data from the one or more data pages, and the saving the extracted data to the external file are performed automatically based on a completion of the load operation by the source database.

12. The system of claim 8, wherein the identifying the one or more data pages of the source database, the extracting data from the one or more data pages, and the saving the extracted data to the external file are performed based on the load operation being identified in the transaction log by a target database system of the database management system.

13. The system of claim 8, wherein the processing device executes computer readable instructions that cause a database scraper module to search the source database for data pages whose headers contain a load LSN value matching the log sequence number associated with the load operation and to combine the identified data pages into an external file for provision to the target database system.

14. The system of claim 8, further comprising a communications network interface configured to periodically transmit the transaction log from the source database system to the target database system, wherein the processing device is configured to identify the load operation upon processing the periodically transmitted transaction log.

15. A computer program product for replicating unlogged data changes in a database management system, the computer program product comprising:

a set of one or more computer-readable storage media;

program instructions, collectively stored in the set of one or more storage media, for causing a processor set to perform the following computer operations:

identifying a load operation in a transaction log for the database management system;

identifying a log sequence number (LSN) associated with the load operation;

identifying one or more data pages of a source database that have a header that includes a load LSN field that is written once when the data page is created for the load operation and thereafter remains unchanged which includes the LSN associated with the load operation, the header further including a page LSN field that is updated each time data stored on the page is modified;

extracting data from the one or more data pages and saving the extracted data to an external file for provision to a target database system via a communications network; and updating a target database of the target database system by loading the extracted data in the external file into the target database, wherein the program instructions further cause the processor set, immediately upon completion of the load operation and without receiving a request from the target database system, to extract the data from the identified data pages and transmit the external file to the target database system.

16. The computer program product of claim 15, wherein the program instructions further cause the processor set to search the source database for data pages whose headers contain a load LSN value matching the log sequence number associated with the load operation and to combine the identified data pages into an external file for transfer to the target database system.

17. The computer program product of claim 15, wherein the program instructions further cause the processor set to periodically transmit the transaction log from the source database system to the target database system via a communications network and to identify the load operation upon processing the periodically transmitted transaction log.

* * * * *